(12) United States Patent
Schimpe (10) Patent No.: US 8,073,332 B2
(45) Date of Patent: Dec. 6, 2011

(54) PHOTONIC CROSS-CONNECT

(75) Inventor: Robert Schimpe, Ottobrunn (DE)

(73) Assignee: Nokia Siemens Networks Oy, Espoo (FI)

( * ) Notice: Subject to any disclaimer, the term of this patent is extended or adjusted under 35 U.S.C. 154(b) by 566 days.

(21) Appl. No.: 12/275,915

(22) Filed: Nov. 21, 2008

(65) Prior Publication Data

US 2009/0142058 A1 Jun. 4, 2009

(30) Foreign Application Priority Data

Nov. 21, 2007 (EP) .................................... 07022625

(51) Int. Cl.
*H04J 14/02* (2006.01)
(52) U.S. Cl. ................ 398/83; 398/49; 398/50
(58) Field of Classification Search ............... 398/56, 398/50
See application file for complete search history.

(56) References Cited

U.S. PATENT DOCUMENTS

| 6,256,433 | B1 | 7/2001 | Luo et al. | |
|---|---|---|---|---|
| 7,043,159 | B1 * | 5/2006 | Solheim | 398/83 |
| 7,764,881 | B2 * | 7/2010 | Aoki | 398/2 |
| 2001/0024542 | A1 * | 9/2001 | Aina et al. | 385/24 |
| 2006/0098981 | A1 | 5/2006 | Miura et al. | |

FOREIGN PATENT DOCUMENTS

WO  WO 2006/114435 A  11/2006

* cited by examiner

*Primary Examiner* — Jessica Stultz
*Assistant Examiner* — Tuan Nguyen
(74) *Attorney, Agent, or Firm* — Laurence A. Greenberg; Werner H. Stemer; Ralph E. Locher (57) ABSTRACT

A photonic cross-connect includes a plurality of ingress WS-switches with drop outputs outputting WDM drop signals including odd channels and a plurality of egress WS-switches for receiving WDM add signals including add channels. Wavelength selective elements in a drop path and in an add path comply with a double frequency spacing and about a double bandwidth of the ingress WS-switches or egress WS-switches. If both odd and even channels are dropped and added, separate add and drop paths are provided for the odd and for the even channels.

15 Claims, 5 Drawing Sheets

PHOTONIC CROSS-CONNECT

CLAIM FOR PRIORITY

This application claims the benefit of priority to European Application No. 07022625, filed Nov. 21, 2007, the contents of which hereby incorporated by reference.

TECHNICAL FIELD OF THE INVENTION

The invention is directed to a photonic cross-connect with add-drop functions.

BACKGROUND OF THE INVENTION

Photonic (also called optical) cross-connects are based on the idea that a channel (more exactly a single signal) from a plurality of received WDM signals (wavelength division multiplex signals) can be redirected into any one of transmitted WDM signals. Most of the cross-connects avoid wavelength conversion, because it is cost effective and, if optical-electrical conversion and 3R-regeneration is not used, reduces the signal quality. Another restriction for the signal quality comes from the wavelength selective elements. These problems increase, if DWDM signals (dense wavelength division multiplex signals) are transmitted.

To singularize single channels (single signals) of a DWDM signal and to combine a plurality of channels to a DWDM signal, it is necessary to use very narrow filters or similar wavelength selecting elements. This results in a reduction of signal quality. For dropping and adding channels (single signals) from and respectively to a DWDM signal, wavelength selecting elements are also necessary, but neither the quality of the dropped channels nor the quality of the added channels should be reduced. Beside this, a certain switching flexibility is also necessary for outputting drop signals and for inserting add signals.

Modern photonic cross-connects comprise optical multiplexers, demultiplexers, tuneable filters and wavelength selective switches. A photonic cross-connect is disclosed in the patent application US 2006/0098981 A1. Each through or express channel has to pass through a WSS (wavelength selective switch) and a multiplexer. This can be accepted in most cases. But each add and each drop signal has to pass through three narrow filter elements, this means that each signal (referred to as channels) has to pass three narrow filter elements in an add path and at least three narrow filter elements in an drop path even in a short point to point connection. The result is a significant reduction of signal quality.

WS-switches are used for realizing cross-connect and add-drop functions. A WSS functionality can be realized by different technologies. By means of these technologies, e.g. micro-electro-mechanical-systems (MEMS), an optical WDM signal received by an input port can be switched frequency selective to a plurality of output ports and vice versa. The realisation of a frequency-selective switching matrix with a plurality of inputs and outputs is possible by applying these elements.

SUMMARY OF THE INVENTION

The invention discloses a cross-connect offering high signal quality cross-connections and sufficient add-drop flexibility.

The improvement in signal quality is obtained by separate processing of odd and even drop channels and odd and even add channel. The drop and the add signals have to pass wide filters in the whole drop path, e.g. a deinterleaver, a drop arrangement and a demultiplexer, respectively in the add path, e.g. a multiplexer and an add arrangement.

The impairment of signal quality of the through/express signals is reduced by substituting the ingress WS-switches by power splitters.

Full add and drop capability is achieved if odd and even channels are dropped, where odd and even channels are also processed separately.

In one aspect, power splitters and deinterleavers are used instead of ingress WS-switches for dropping odd and even channels.

If only a few add and drop channels are needed, simple but upgradeable add and drop arrangements reduce the costs for a basic network.

The switching flexibility on the client side is improved if add and drop arrangements with switching capability are used. The drop and the add arrangement can be upgraded to cross-connect-arrangements.

In another aspect of the invention, the power splitters are substituted by additional WS-switches to improve crosstalk properties.

In another aspect, cost-effective drop and add arrangements can be even used, if only a few odd and even channels are dropped and inserted.

In another aspect it is advantageous to use at least one demultiplexer with the standard grid or the offset grid to singularize odd or even drop channels and at least one multiplexer with the standard grid or the offset grid to combine odd channels or even channels.

In still another aspect of the invention, it is advantageous to use at least two different demultiplexers, whose inputs are connected to outputs of the drop arrangements and at least two different multiplexers, whose outputs are connected to inputs of the add arrangement. A plurality of switching possibilities of the drop and add arrangement and of the demultiplexers and multiplexers enables the dropping and adding of channels (signals) carrying signals of the same frequency. At least two different demultiplexers and multiplexers are always necessary because odd and even channels have to be processed separately.

In yet another aspect of the invention, which refers to drop and add arrangements for odd and even channels, it is advantageous to use at least two demultiplexers, whose inputs are connected to outputs of the first drop arrangements and at least two further demultiplexers, whose inputs are connected to outputs of the second drop arrangements and at least two multiplexers and two further multiplexers, whose outputs are connected to inputs of the at least two add arrangement. Odd and even channels are processed in different demultiplexers and multiplexers with standard and offset grid separately to avoid an impairment of signal quality.

The switching capability for client drop signals and client add can be improved by using optical or electrical switch matrices.

It is another aspect to integrate signal quality monitors to initiate protection switching.

BRIEF DESCRIPTION OF THE DRAWINGS

Examples of the invention of preferred embodiments are described below with reference to accompanying figures, wherein.

DETAILED DESCRIPTION OF THE INVENTION

Figure 1:
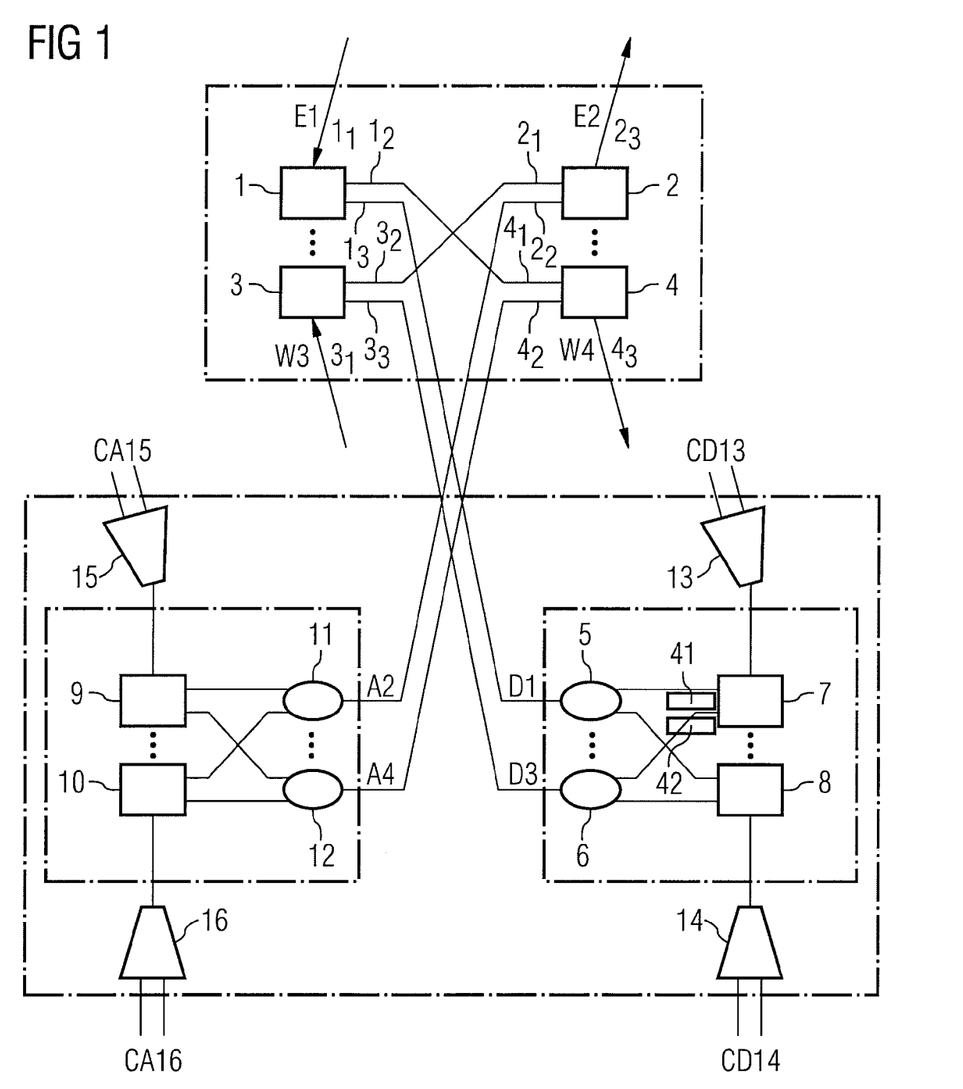
FIG. 1 shows a drawing of a first embodiment of a photonic cross-connect comprising ingress and egress wavelength selective switches.

FIG. 1 shows a schematic drawing of a first embodiment of the invention. Elements for amplifying or attenuating signals are not shown for clarity reasons and also not mentioned in the description. The basic cross-connect shown in this figure has a plurality of ingress wavelength selective switches and egress wavelength selective switches, which are further down referred to as WSS or WS-switches. Two ingress WS-switches 1 and 3 and two egress WS-switches 2 and 4 are shown. The first WS-switch 1 receives at an ingress port $1_1$ a first DWDM signal E1 (dense wavelength division signal; dense is here not restricted to a certain channel spacing) from a first direction, e.g. "east", and the first egress WSS 2 transmits a second DWDM signal E2 in this direction at an egress port $2_3$. Both ports represent a bidirectional port for exchanging DWDM signals in the first direction "east". The other couples of ingress and egress WS-switches, e.g. ingress WSS 3 and egress WSS 4, exchange DWDM signals W3, W4 via an ingress port $3_1$ and an egress port $3_3$ in a second direction "west".

An ingress WS-switch 1, 3 has a plurality of outputs. The through or express channels of the received DWDM signals are output at "through outputs". Each through output $1_2$ and $3_2$ is connected to a "through input" $2_1$ or $4_1$ respectively of an egress WSS 2 or 4, which transmits a DWDM signal W4, E2 in another direction as in the direction from which the DWDM signal is received. A through channel (or more exact through/express signal) received at the ingress WSS 1 from the direction east is e.g. transferred to the egress node 4 and send in the direction west. Cross-connects are usually designed for more than two directions, but only the connections for two directions are shown for clarity reasons.

Each ingress WSS 1 or WSS3 has beside the through outputs at least one additional output $1_3$, $3_3$, which is called a "drop output" used to output a WDM drop signal. According to this embodiment e.g. odd channels (channel 1, 3, 5, . . . ) are dropped at a WSS drop output, this is every second channel of the DWDM signal or, in other words: These are the channels of the standard grid for WDM signals with a frequency spacing of 100 GHz or the "offset" channels (channel 2, 4, 6, . . . ) shifted by 50 GHz. While this cross-connect is designed for dropping and adding odd channels the next cross-connect in a transmission line can be designed for dropping the even channels (of course, also e.g. every fourth or sixth channel can also be output).

Drop outputs $1_3$, $3_3$ of the ingress WS-switches 1 and 3 are connected with drop inputs of a drop arrangement 5,6,7,8. Because only two ingress WS-switches are shown in FIG. 1 for clarity reasons, only few elements of the drop arrangement are illustrated. A common drop arrangement for a two directions cross-connect comprises two drop power splitters 5 and 6, each receiving a WDM drop signal D1 or D3 respectively, and two drop WS-switches 7 and 8. Outputs of the power splitters 5 and 6 are connected with an input of each drop WS-switch 7 or 8 respectively. Therefore each drop WSS 7 or drop WSS 8 receives a combination of a first and a second WDM drop signal D1 and D3. The drop arrangement has a possibility to select certain channels and to feed the selected channels, referred to as "WDM client drop signals", to a certain demultiplexer 13 or 14, which outputs singularized client drop signals CD13, CD14.

If the switching flexibility of this "drop matrix" is not needed, or if a system is installed for only a few clients, all the WDM drop signals of the same WDM grid can be combined and output by one demultiplexer 13. A basic cross-connect as shown in FIG. 1 can be upgraded easily if power splitters with a plurality outputs and WS-switches with a plurality of inputs are used. Each drop signal passes once a narrow filter of an ingress WSS.

A common add arrangement 9,10,11,12 is designed similar to the drop arrangement and comprises WS-switches 9, 10 and power splitters 11, 12 used as power combiners. Two add WS-switches 9 and 10 receive multiplexed client add signals CA15, CA16 of the same frequency grid, referred to as "WDM client add signals", from multiplexers 15 and 16 respectively. Outputs of each WSS 9, 10 are connected with an input off all power combiners 11, 12, an add output of the combiner 11 is connected to an add input $2_2$ of the first egress WSS 3 and an add output of the combiner 12 is connected to an add input $4_2$ of the second egress WSS 4.

The received client add signals CA15, CA16 meet also the requirements of the WDM standard grid and therefore correspond to the odd channels. These channels are combined by multiplexers 15 and 16, pre-selected by the add WS-switches 9, 10—both have the frequency spacing of the standard grid (100 GHz) and the broad pass-band of the standard grid channels, which is about the double bandwidth of the DWDM channels—and fed to the power combiners 11 and 12 to be combined to WDM add signals A2, A4, which are fed to the add inputs $2_2$ and $4_2$ of the egress WS-switches.

The add arrangement has also a switching flexibility and can feed the clients signals to a selected egress WSS. The WDM add signals A2, A4 are inserted into the transmitted DWDM signals E2, W4 by the egress WS-switches 2 and 4. Each client add signal CA15, CA16 passes once a narrow filter of an egress WSS.

To summarize, all through channels are selected by the ingress WS-switches 1 and 3 and fed to another egress WSS 4 or 2 ("another" egress WSS, e.g. 2, is defined as an WSS, which transmits a DWDM signal, e.g. W4, in another user-defined direction, e.g. west", and not in the direction, e.g. "east", from which the selected channel is received by the ingress WSS, e.g. WSS1, as part of the DWDM signal E1. As mentioned before, all WDM drop signals D1, D3 are also selected by the ingress WS-switches 1 and 3 and fed to the drop arrangement. The received client add channels are combined to WDM add signals in the add arrangement and fed to the egress WS-switches.

If the cross-connect is designed for more than two directions more WS-switches with additional outputs and inputs are necessary and the drop and add arrangements are also upgraded. If, in addition, the cross-connect is designed for more traffic directions and therefore comprising additional ingress WS-switches and additional egress WS-switches (but still only odd or even) WDM signals, then it is necessary to upgrade the drop and the add arrangement. Additional power splitters with a further outputs and an additional WS-switches with further inputs are inserted in the drop arrangement and additional demultiplexers and power combiners in the add arrangement. For every additional ingress WSS (or for each further direction) an additional power splitter and an additional WSS and also an additional demultiplexer is necessary. The add arrangement is upgraded in an appropriate way. Of course there are also some less complex solutions but less flexibly solutions possible.

The embodiment of FIG. 1 shows a drop arrangement comprising a first monitoring device 41 and a second monitoring device 42.

The quality of the WDM drop signals is monitored. Protection switching of important channels is initiated if a received DWDM signal, e.g. E1, has a very bad quality or if the transmission line of WSS 1 is interrupted. Protection switching is of course also possible in the other embodiments of the invention.

Figure 2:
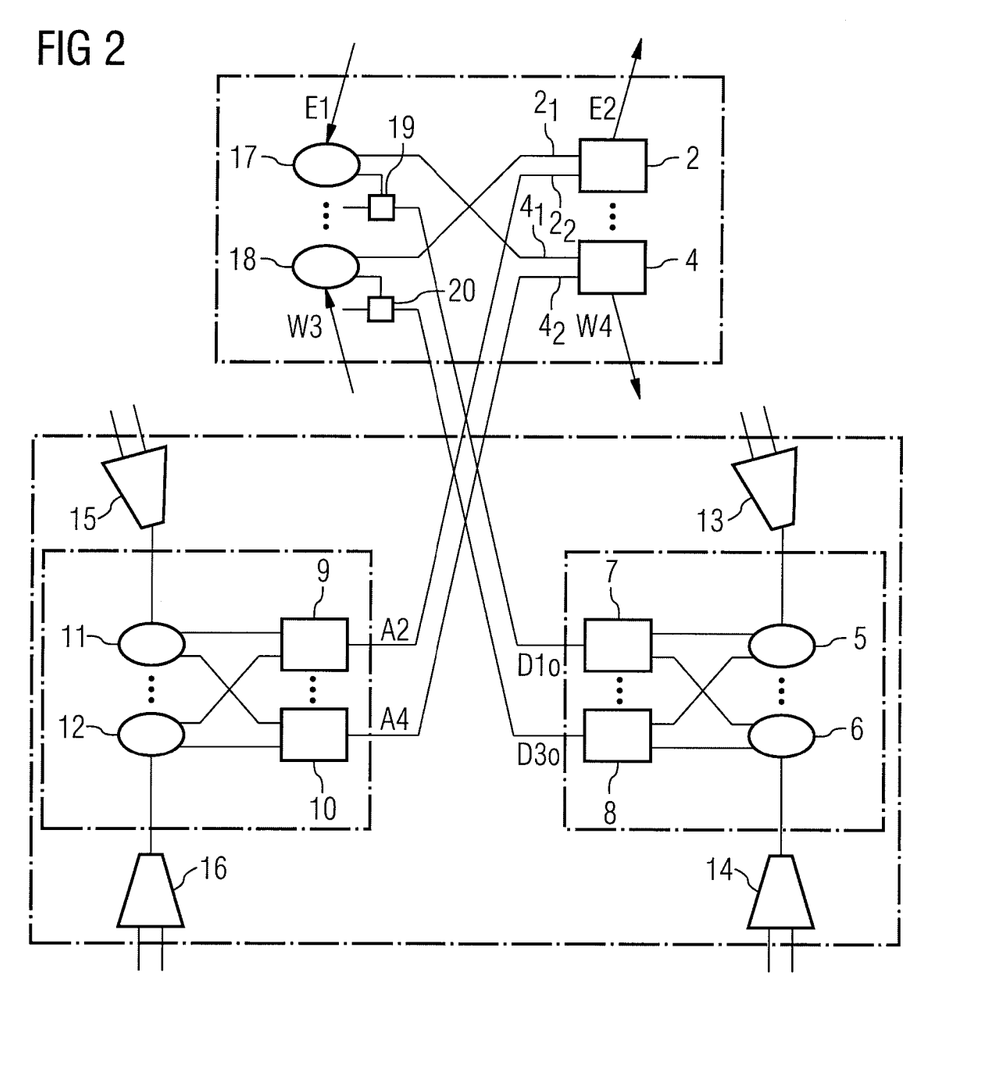
FIG. 2 shows a drawing of a second embodiment with ingress power splitters instead of ingress WS-switches.

FIG. 2 shows a second embodiment of the invention. The ingress WS-switches 1, 3 are substituted by ingress power splitters 17 and 18. An interleaver 19, respectively 20 is inserted downstream of the drop output of each power splitter (the received DWDM signal E1, respectively W2 is output at all through and outputs of the power splitters) to output an odd WDM drop signal D1o, D3o comprising odd drop channels (or even drop channels), which are fed to the drop inputs of the drop arrangement 7,8,5,6. The power splitters 5, 6 and the WS-switches 7, 8 have interchanged their positions (also the arrangement described before can be used). The drop channels are now elected by the WS-switches 7, 8 and the selected drop channels are combined by the power splitters 5, 6, and fed to the demultiplexers 13 and at least 14.

Also in the add arrangement are the positions of the power splitters 11, 12 and the WS-switches 9, 10 are interchanged (but the arrangement described before can also be used). The combined client signals are fed to both add WS-switches 9, 10, which output the first WDM add signal A2 and the second WDM add signal A4 respectively. These signals are fed to the add inputs $2_2$ and $4_2$ of the egress WS-switches 2 and 4 respectively.

The advantage of this arrangement is obvious: Also the through channels have to pass a narrow bandwidth filter element in the egress WSS once, but the switching flexibility of the ingress WS-switches is missing.

Figure 3:
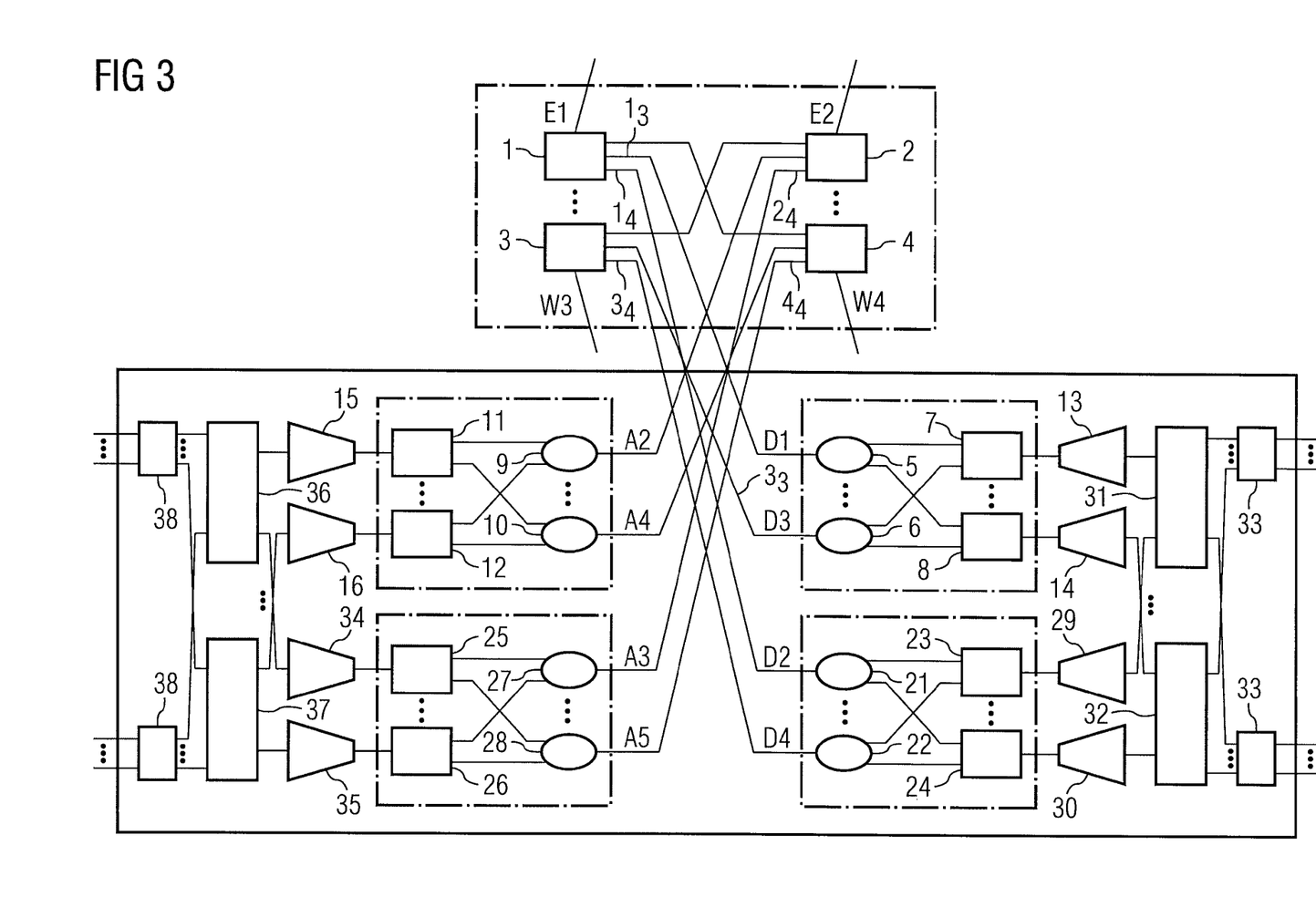
FIG. 3 shows a drawing of a third embodiment with improved cross-connect possibilities.

FIG. 3 shows a third embodiment with full drop and full add capability. At least two outputs of each ingress WSS1 and at least WSS3 are used as drop outputs, the first "odd drop output" $1_3$, $3_3$ outputs a first "odd WDM drop signal" D1 representing odd channels according to the 100 GHz ITU standard grid and a second drop output, the "even drop output" $1_4$, $3_4$ drops a shifted first "even WDM drop signal" D2 representing even channels according to a 50 GHz shifted "offset grid". The ingress WSS2 outputs a second "odd WDM drop signal" D3 and a second "even WDM drop signal" D4.

Odd WDM drop signals D1, D3 with odd channels are fed to the first drop arrangement 5,6,7,8, and shifted even WDM drop signals D2, D4 with even channels are fed to a second drop arrangement 21,22,23,24. Odd and even channels are separately combined with odd and respectively even channels received from other directions (not shown) as described before. Additional demultiplexers 29 and 30 are used to singularize the even drop channels.

According to the ingress WS-switches 1, 3 egress WS-switches 2, 4 with two "add inputs" each are applied, one add input for odd add channels and one add input $2_4$, $4_4$ for even add channels. An appropriate second add arrangement 25,26, 27,28 and additional multiplexers 34, 35 are used to combine the even client add signals and to select two shifted WDM add signals A3 and A5. These signals are fed to the two second add inputs $2_4$, $4_4$ off the egress WS-switches 2, 4 and inserted into the transmitted DWDM signals E2, W4.

Because odd and even channels are processed separately in the add and in the drop arrangements, add signals and drop signals have to pass a narrow filter element once in an ingress WSS or in an egress WSS respectively.

The third embodiment shows in addition optical switch matrices (arrays) 31, 32, which are connected to output terminals of the demultiplexers 13, 14, 29, 30. An additional M(N×K) switch matrices 33 are inserted downstream the switch matrices 31, 32. In case that only two switch matrices 31, 32 and no additional outputs are used, then N=K=2 and M×N is the number of drop channels. In this arrangement each drop channel could be output at each output terminal of the N×N switch matrix. The same switch arrangement with a M(N×N) switch matrix 38 and switching matrices 36, 37 can be used at the add site. Each add channel can be inserted in each of the WDM add signals. Of course, at the drop side also switch matrices 33 with more outputs (K>N) could be used and at the add side switch matrices 38 with more inputs could be used. The switching matrices can be substituted by electrical switch matrices and transponders if optical-electrical and electrical-optical conversion is used.

Figure 4:
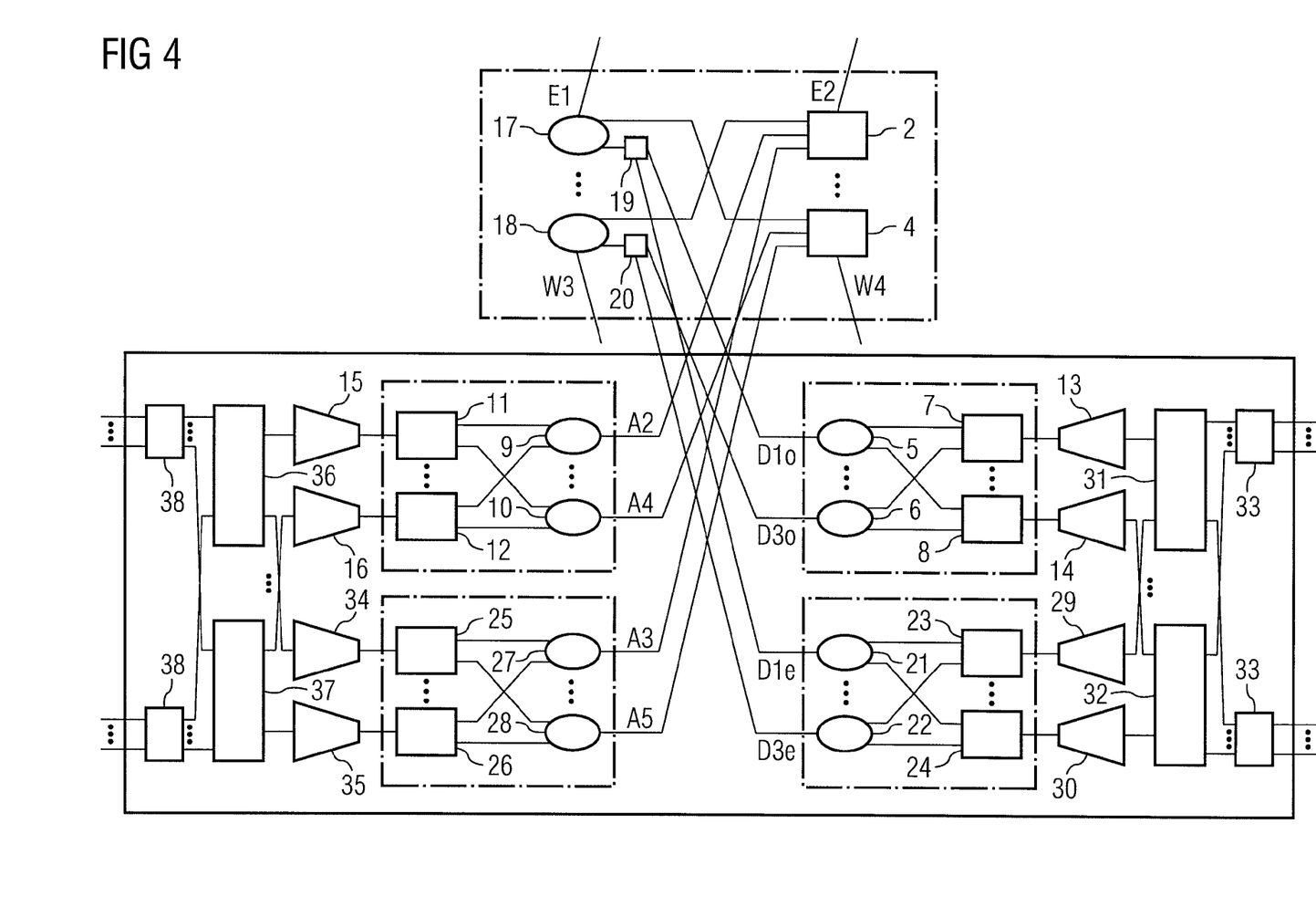
FIG. 4 shows a drawing of a fourth embodiment with ingress power splitters instead of ingress WS-switches with improved cross-connect possibilities.

FIG. 4 shows a fourth embodiment, where, according to FIG. 2, the ingress WS-switches 1, 3 are replaced by optical splitters 17, 18, but in addition to the embodiment shown in FIG. 2 both outputs of the deinterleavers 19, 20 are used to drop the odd channels outputted at a first interleaver output as well as the even channels outputted at a second interleaver output. The odd WDM drop signals D1o and D3o comprising odd channels are fed to the power splitters 5 and 6 respectively, split and fed to the inputs of the WS-switches 7 and 8. Even WDM drop signals comprising even channels are fed via the power splitters 21 and 22 to the inputs of the WS-switches 23 and 24. The selection of odd and even channels is executed in the drop arrangements by the drop WS-switches 7, 8 and 23, 24. A drop arrangement according to FIG. 3 with the same functionality could be also applied in this embodiment.

Figure 5:
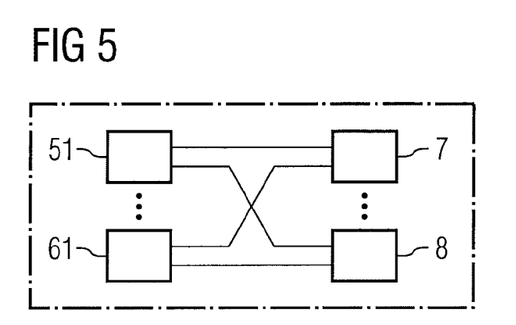
FIG. 5 shows a drawing of a further embodiment of an add or drop arrangement.

FIG. 5 illustrates a further embodiment of a drop arrangement. The power splitters 17 and 18 are replaced by WS-switches 51 and 61. Since two WS-switches with filter characteristics are connected in series, the influence of neighbour channels is reduced.

Figure 6:
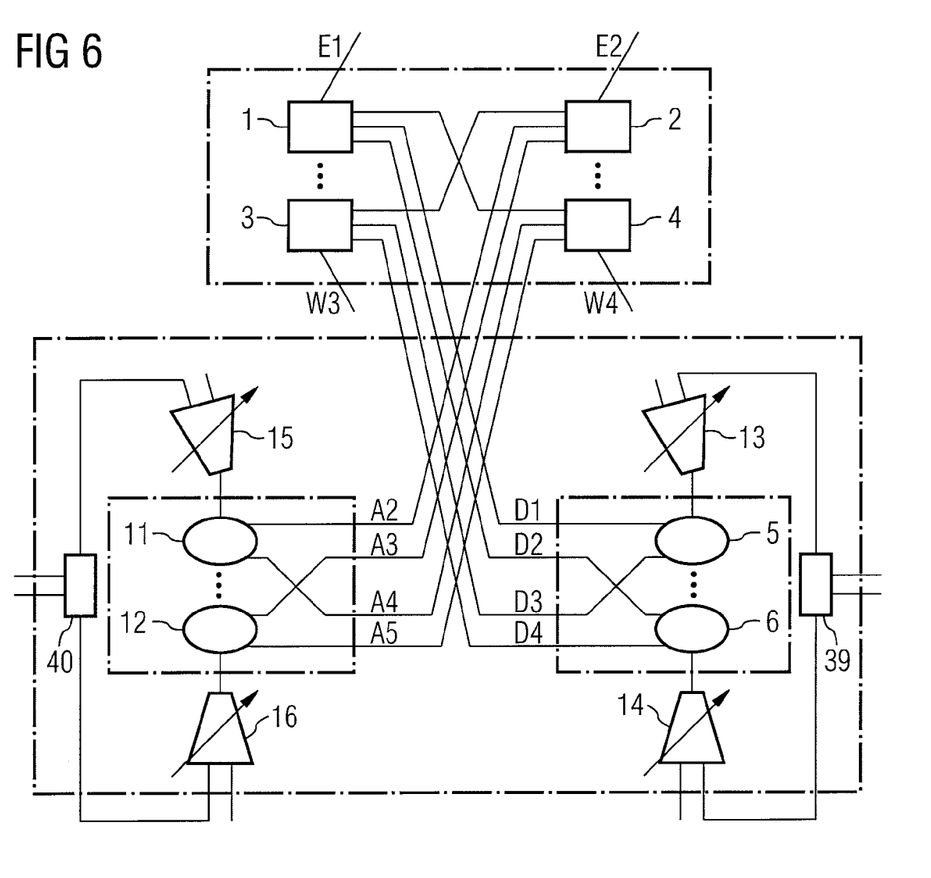
FIG. 6 shows a drawing of a simplified third embodiment with less switching capabilities of the drop and add arrangements.

FIG. 6 illustrates an embodiment of the cross-connect as shown in FIG. 3 with simplified drop and add arrangements. The drop arrangement comprises power splitters 5, 6 (or WS-switches instead of these power splitters/combiners, not shown). Odd drop channels are combined by the power combiner 5 and even drop channels are combined the power combiner 6 respectively, which are directly connected to the odd and even drop outputs of the ingress WS-switches 1 and 3. The ingress WS-switches 1 and at least 3 are responsible for the selection of all drop channels. The selection of the through channels is also carried out by the ingress WS-switches. The outputs of the power splitters 5, 6 are connected to e.g. tuneable demultiplexers 13 and 14 respectively. The drop arrangement can be upgraded by applying combiners with more inputs.

The add arrangement is designed in the same way and comprises at least two power splitters 11, 12. Each power splitter receives odd or even client add signals from the (tuneable) multiplexers 15 and 16 and distributes the odd WDM add signals A2, A4 and the even WDM add signals A3, A5 to the odd or even add inputs off the egress WS-switches, which are responsible for the selection of all add channels. The add arrangement could also be upgraded by applying splitters with more outputs.

A drop switch matrix 39 connected to the outputs of the demultiplexers 13, 14 and an add switch matrix 40 connected upstream the inputs of the multiplexers 15, 16 enable a satisfactory switching flexibility for many applications.

The invention claimed is:

1. A photonic cross-connect, comprising:
a first ingress port receiving a first dense wavelength division multiplex (DWDM) signal connected to an input of a first ingress wavelength selective switch (WSS);
an egress port connected to an output of a first egress WSS transmitting a second DWDM signal,
the first ingress port and the first egress port representing a bidirectional port for exchanging DWDM signals in a first direction,
at least a second ingress port receiving a third DWDM signal connected to an input of at least a second ingress WSS and at least a second egress port connected to an output of at least a second egress WSS transmitting a fourth DWDM signal, the second ingress port and the second egress port representing a bidirectional port for exchanging DWDM signals in a second direction,
the first and the at least second ingress WSS having at least one through output, each through output being connected to an through input of each other egress WSS transmitting DWDM signals (W4, E2) in another direction,
the first and the at least second ingress WSS having drop outputs outputting a first WDM drop signal and respectively at least a second WDM drop signal, both WDM drop signals comprising odd or only even channels,
the first and the at least second egress WSS having add inputs for receiving a first WDM add signal and at least a second WDM add signal respectively, both WDM add signals comprising odd or only even channels,
a drop arrangement with a first and at least a second drop input, connected to drop outputs of the first and at least the second ingress WSS respectively, the drop arrangement combining odd channels or even channels of the WDM drop signals, and with at least one output connected to a drop demultiplexer singularizing the WDM drop signals into client drop signals,
an add arrangement with at least one input connected to an output of a multiplexer combining received client add signals, with a first add output and at least a second add output connected to the add inputs of the first egress WSS and the at least second egress WSS respectively, and
wherein wavelength selective elements in a drop path and in an add path comply with at least a double frequency spacing and about a double bandwidth of the ingress WS-switches or egress WS-switches.

2. The photonic cross-connect according to claim 1, wherein
the ingress WS-switches are substituted by power splitters,
through outputs of the power splitters are fed to an through input of each other egress WS-switches, and a deinterleaver is inserted downstream of a drop output of each power splitter, and
the odd or the even channels are outputted from outputs of the deinterleavers and fed to the drop arrangement.

3. The photonic cross-connect according to claim 1, wherein
the ingress WS-switches have a first drop outputs for outputting odd WDM drop signals comprising odd drop channels a second drop output for outputting even WDM drop signals comprising even drop channels,
the egress WS-switches have a first add input for receiving odd WDM add signals with odd channels a second add input for receiving an even WDM add signal with even channels, and
the odd WDM drop signals are fed to the first drop arrangement and the even WDM drop signals are fed to the second drop arrangement and
the odd WDM add signals are output from the first add arrangement and the even WDM add signals are output from a second add arrangement.

4. The photonic cross-connect according to claim 3, wherein
the ingress WS-switches are substituted by power splitters,
the through outputs of the power splitters are fed to an input of the other egress WS-switches for transmitting a DWDM signal in another direction, and a deinterleaver is inserted downstream of a drop output of each power splitter outputting an odd WDM drop signal with odd channels and the even WDM drop signal with even channels.

5. The photonic cross-connect according to claim 1, wherein
the drop arrangement comprises at least two power splitters receiving WDM drop signals and one WSS or vice versa,
the add arrangement comprises at least one add WSS and two power splitters or vice versa outputting WDM add signals,
the drop WS-switches and add WS-switches comply with a double frequency spacing and about a double bandwidth of the ingress WS-switches or egress WS-switches respectively.

6. The photonic cross-connect according to claim 1, wherein
the drop arrangement comprises a first power splitter and at least a second power splitter receiving WDM drop signals with at least two outputs each,
a first drop WSS and least a second drop WSS with at least two inputs each,
a first output of each drop power splitter is fed to a first and at least a second input of the first drop WSS, and a second output of each drop power splitter is fed to a first and at least a second input the at least second WSS or vice versa,
the add arrangement comprises a first add WSS and at least a second add WSS with at least two outputs each, and a first power splitter and at least a second power splitter with at least two inputs each and outputting WDM add signals, first outputs of the first and the at least second add WSS are fed to a first and at least a second input of the first power splitter, and second outputs of the first and the at least second add WSS are fed to a first and at least a second input of the at least second power splitter or vice versa, and
drop WS-switches and add WS-switches comply with at least a double frequency spacing and about a double bandwidth of the ingress WS-switches or egress WS-switches respectively.

7. The photonic cross-connect according to claim 6, wherein the power splitters or power combiners are substituted by additional wavelength selective switches.

8. The photonic cross-connect according to claim 3, wherein
the drop arrangement comprises a first power combiner for combining odd WDM drop signals and a second power combiner for combining even WDM drop signals, and the add arrangement comprises a first power splitter for outputting odd WDM add signals with odd channels and a second power splitter for outputting even WDM Add signals with even channels.

9. The photonic cross-connect according to claim 1, wherein at least one demultiplexer is inserted downstream of the drop arrangement for singularizing a WDM client drop signal into a client drop signals and at least one multiplexer inserted upstream of the add arrangement for receiving client add signals and combining these signals to a WDM client add signal.

10. The photonic cross-connect according to claim 6, wherein
at least two demultiplexers are inserted downstream of the drop arrangement for singularizing first WDM client drop signals with odd channels into client drop signals, and
at least two multiplexers are inserted upstream of the add arrangement for receiving client add signals with odd channels and combining these signals to first WDM client add signals.

11. The photonic cross-connect according to claim 3, wherein
at least two demultiplexers inserted downstream of the first drop arrangement for singularizing first WDM client drop signals with odd channels and
at least two further demultiplexers inserted downstream of the second drop arrangement for singularizing second WDM client drop signals with even channels into further client drop signals, and
at least two multiplexers inserted upstream of the first add arrangement for receiving client add signals with odd channels and combining the signals to first WDM client add signals and at least two multiplexers inserted upstream of the second add arrangement for receiving client add signals with even channels and combining the signals to second WDM client add signals with even channels.

12. The photonic cross-connect according to claim 9, further comprising:
a drop switch matrix connected downstream of outputs of the demultiplexers of the drop arrangement and outputting client drop signals; and
an add switch matrix connected upstream to inputs of the multiplexers of the add arrangement and receiving client add signals (CA15, CA16) at its inputs.

13. The photonic cross-connect according to claim 12, further comprising:
a first drop switch matrix connected downstream of each first demultiplexer of the first and of at least a second drop arrangement;
a second drop switch matrix connected downstream of each second demultiplexer of the first and of the at least second drop arrangement;
a first add switch matrix connected upstream of each first add multiplexer of the first and at least a second add arrangement; and
a second add switch matrix connected upstream of each second add multiplexer of the first and the at least second add arrangement.

14. The photonic cross-connect according to claim 13, further comprising:
a M(N×K) drop switch matrix, wherein N and K are at least equal to the number of the drop switch matrices, M×K is the number of outputs and M×N the number of inputs, connected downstream of the drop switching matrices; and
a M(N×K) add switching matrix, wherein N and K are at least equal to the number of the add switching matrices and M×K is the number of outputs and M×N the number of inputs, connected upstream the add switching matrices.

15. The photonic cross-connect according to claim 14, wherein the drop arrangement comprises monitoring devices for protection switching.

* * * * *